United States Patent Office 3,734,967
Patented May 22, 1973

3,734,967
1-(4-OXOPENT - 1 - ENYL)-1,3-DIMETHYLCYCLO-HEX-2-ENE, 1-(4 - OXOPENT - 1 - ENYL)-1,3-DI-METHYLCYCLOHEX - 3 - ENE AND THEIR METHYL HOMOLOGS
Werner Hoffmann, Heinrich Pasedach, and Horst Pommer, Ludwigshafen, Germany, assignors to Badische Anilin- & Soda-Fabrik Aktiengesellschaft, Ludwigshafen (Rhine), Germany
No Drawing. Filed May 29, 1969, Ser. No. 829,113
Claims priority, application Germany, June 1, 1968, P 17 68 596.0
Int. Cl. C07c 49/48
U.S. Cl. 260—586 R                 9 Claims

ABSTRACT OF THE DISCLOSURE 1-(4-oxopent-1-enyl)-1,3-dimethylcyclohex-2-ene, 1-(4-oxopent-1-enyl)-1,3-dimethylcyclohex - 3 - ene and their methyl homologs and a process for the production of these compounds in which formic acid is allowed to act on a 6,10-dimethylundeca-3,5,10-trien-2-one.

---

The present invention relates to the new compounds 1-4-oxopent-1-enyl)-1,3-dimethylcyclohex-2-ene (Ia) and 1-(4-oxopent-1-enyl)-1,3-dimethylcyclohex-3-ene (Ib) and their methyl homologs and also to a process for the production of these compounds.

We have found that these compounds (Ia) and (Ib), which have the general formulae:

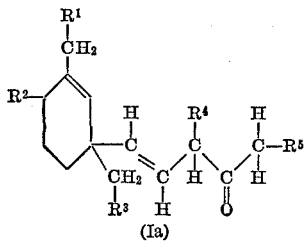

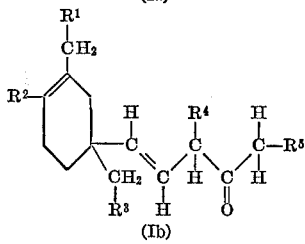

where the radicals $R^1$, $R^2$, $R^3$, $R^4$ and $R^5$ may each be a hydrogen atom or a methyl group, are obtained in a remarkable reaction by allowing formic acid to act on a 6,10-dimethylundeca-3,5,10-trien-2-one having the general Formula II:

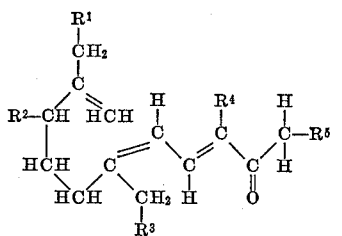

where $R^1$, $R^2$, $R^3$, $R^4$ and $R^5$ have the above meanings.

Preferred starting materials (II) are α-pseudoionone ($R^1$ to $R^5$ all denoting hydrogen atoms) and its monomethyl or dimethyl homologs. The Compounds (II) are known or accessible by known methods.

Formic acid effects a catalytic cyclization of the Compounds (II), as a rule to form a mixture of about equal parts of (Ia) and (Ib). The reaction concerned is an anomalous reaction because cyclization of α-pseudoionone and β-pseudoionone with sulfuric acid or phosphoric acid is known to give α-ionone and β-ionone and in cyclization of β-pseudoionone with formic acid α-ionone is formed. In the nomenclature of (Ia) and (Ib), α-ionone would be referred to as 1-(3-oxobut-1-enyl)-2,2,6-trimethylcyclohex-5-ene and β-ionone would be referred to as 1-(3-oxobut-1-enyl)-2,2,6-trimethylcyclohex-6-ene.

The amount and concentration of the formic acid are not critical and merely have the usual effect on the reaction rate. A satisfactory rate is obtained even with one tenth of the weight of (II); above twenty times the weight a further excess of formic acid has no appreciable effect on the process, especially as from this point the time required for processing determines the speed.

It is advantageous to carry out the reaction in a homogeneous liquid phase, i.e. in pure formic acid or in the presence of a solvent.

Suitable solvents include saturated aliphatic or aromatic hydrocarbons which are liquid at reaction temperature such as ligroin, benzene, toluene, xylene; chlorohydrocarbons such as chloroform and carbon tetrachloride; nitroparaffins such as nitromethane and nitropropane; alcohols such as methanol, ethanol and isobutanol; ethers such as diethyl ether or tetrahydrofuran; and aliphatic carboxylic acids such as acetic acid and propionic acid. The weight of solvent is advantageously from 0.1 to 10 times the weight of (II).

The presence of water is not detrimental so that aqueous solutions of formic acid may be used instead of pure formic acid; a concentration of more than 50% by weight is however recommended.

The reaction is advantageously carried out at from 0° to 250° C. At lower temperatures the reaction is too slow and at higher temperatures secondary reactions such as resinification and decomposition occur to an increasing extent. The temperature range of from 30° to 100° C. is particularly advantageous because atmospheric pressure may then be used. Subatmospheric or superatmospheric pressure may be used but does not offer any particular advantage.

The course of the reaction may be followed by the decrease in the ultraviolet adsorption at 290 to 295 millimicrons of a processed sample (starting material $$E_{1\,cm.}^{1\%}$$

about 1200 and reaction product $$E_{1\,cm.}^{1\%}$$

about 40 at 290 to 295 millimicrons). Processing the reaction mixture takes place in known manner, for example by extracting the water-soluble constituents with water and fractionally distilling the organic phase. The isomers (Ia) and (Ib) (the ratio of which can be determined by gas chromatography) may also be separated in this way although it is often unnecessary.

3

The products are valuable perfumes which in their fundamental character resemble the structurally related ionones and their homologs, but differ clearly therefrom in their shades, some of which are original, for example raspberry. Where the compounds are to be used direct as perfumes, whether as pure isomers or as mixtures of isomers, it is advisable to carry out their production and purification under mild conditions, for example by excluding atmospheric oxygen.

The invention is illustrated by the following examples.

EXAMPLE 1

1-(4-oxopent-1-enyl)-1,3-dimethylcyclohex-2-ene and 1-(4-oxopent-1-enyl)-1,3-dimethylcyclohex-3-ene.

500 g. of 6,10-dimethyl-3,5,10-trien-2-one (-pseudoionone) is added in the course of thirty minutes at 50° C. to 2500 g. of pure formic acid while stirring and the mixture is kept at this temperature for another thirty minutes. 500 g. of ice is then added, the aqueous phase formed is extracted several times with hexane, the extracts are united with the original organic phase, and the combined mixture is washed and neutralized several times with sodium hydrogen carbonate solution and water and then worked up conventionally by distillation.

The yield of the abovementioned mixtures of isomers (about equal parts of each) is 75%.

The physical characteristics are:

| | B.P. (0.1 mm.) | $n_D^{25}$ |
| --- | --- | --- |
| For the mixture | 65° to 70° C | 1.4876 |
| For the 2-ene isomer | 65° to 66° C | 1.4873 |
| For the 3-ene isomer | 69° to 70° C | 1.4879 |

Both isomers have a pleasant raspberry odor.

EXAMPLE 2

1-(4-oxopent-1-enyl)-1,3,4-trimethylcyclohex-2-ene and 1-(4-oxopent-1-enyl)-1,3,4-trimethylcyclohex-3-ene:

A mixture of the two isomers is obtained in the manner described in Example 1 from 200 g. of 6,9,10-trimethylundeca-3,5,10-trien-2-one and 1000 g. of pure formic acid. The yield is 77%. Mainly the 3-ene isomer is formed.

The physical characteristics are: for the 3-ene isomer: boiling point 82° to 86° C. at 0.4 mm.; $n_D^{25}=1.4860$.

The product has an iris-like odor. The semicarbazone has a melting point of 107° to 109° C. when recrystallized from ligroin.

EXAMPLE 3

1-(4-oxopent-1-enyl)-1-ethyl-3-methylcyclohex-2-ene and 1-(4-oxopent-1-enyl)-1-ethyl-3-methylcyclohex-3-ene:

These compounds are obtained as described in Example 1 from 100 g. of 6-ethyl-10-methylundeca-3,5,10-trien-2-one and 250 g. of formic acid in a yield of 68%.

The physical characteristics are: for the mixture: boiling point 105° to 110° C. at 2 mm.; $n_D^{25}=1.4916$.

The odor of the mixture is sweet and iris-like.

EXAMPLE 4

1-(4-oxo-3-methylpent-1-enyl)-1,3-dimethylcyclohex-2-ene and
1-(4-oxo-3-methylpent-1-enyl)-1,3-dimethylcyclohex-3-ene:

The above-mentioned compounds are obtained as a mixture of isomers in a yield of 63% in the manner described in Example 1 from 250 g. of formic acid and 50 g. of 3,6,10-trimethylundeca-3,5,10-trien-2-one in a ten-minute reaction at 80° C.

The physical characteristics are: for the mixture: boiling point 69° to 74° C. at 0.03 mm.; $n_D^{25}=1.4948$.

Both isomers have a fresh, flowery odor of iris.

4

What we claim is:
1. A compound selected from the group consisting of

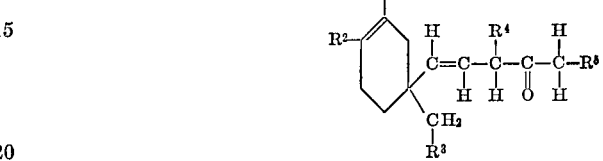

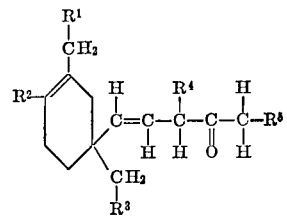

where each of the radicals $R^1$, $R^2$, $R^3$, $R^4$ and $R^5$ denotes a hydrogen atom or a methyl group.

2. 1-(4-oxopent-1-enyl)-1,3,4-trimethylcyclohex-2-ene.
3. 1-(4-oxopent-1-enyl)-1,3,4-trimethylcyclohex-3-ene.
4. 1 - (4 - oxopent-1-enyl)-1-ethyl-3-methylcyclohex-2-ene.
5. 1 - (4 - oxopent-1-enyl)-1-ethyl-3-methylcyclohex-3-ene.
6. 1-(4-oxo - 3 - methylpent-1-enyl)-1,3-dimethylcyclohex-2-ene.
7. 1 - (4 - oxo-3-methylpent-1-enyl)-1,3-dimethylcyclohex-3-ene.
8. A process for the production of an isomeric mixture of the compounds having the formulae:

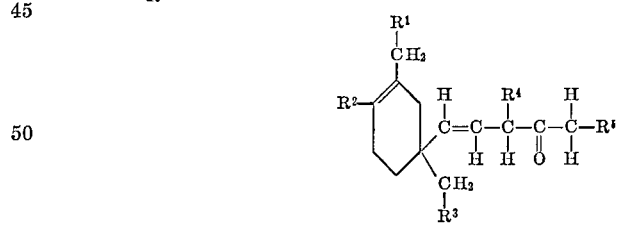

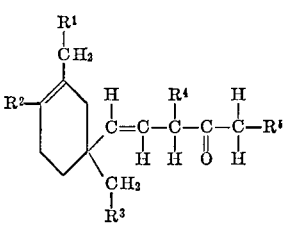

wherein $R^1$, $R^2$, $R^3$, $R^4$ and $R^5$ each denotes hydrogen or methyl, which process comprises contacting formic acid at a temperature of from 0° C. to 250° C. with a 6,10 dimethylundeca-3,5,10-trien-2-one having the formula:

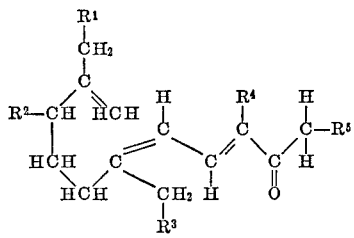

wherein $R^1$, $R^2$, $R^3$, $R^4$ and $R^5$ have the same meanings set forth above.

9. A process as claimed in claim 8 wherein said temperature is about 30° C. to 100° C.

(References on following page)

References Cited

UNITED STATES PATENTS

| | | | |
|---|---|---|---|
| 2,740,817 | 4/1956 | Naves | 260—587 |
| 3,117,982 | 1/1964 | Barton | 260—587 |
| 3,219,696 | 11/1965 | Van Geelen | 260—586 R |
| 3,492,360 | 1/1970 | Kimel et al. | 260—586 R |

FOREIGN PATENTS

| | | | |
|---|---|---|---|
| 741,047 | 11/1955 | Great Britain | 260—586 R |
| 788,680 | 1/1958 | Great Britain | 260—587 |

OTHER REFERENCES

Suga et al., "Chem. Abstracts," vol. 60, p. 10723b, (1963).

Ishikawa, "Chem. Abstracts," vol. 68, p. 13191T, (1968).

BERNARD HELFIN, Primary Examiner

N. MORGENSTERN, Assistant Examiner

U.S. Cl. X.R.

260—587; 252—522